United States Patent
Goto et al.

(10) Patent No.: US 9,701,074 B2
(45) Date of Patent: Jul. 11, 2017

(54) METHOD OF MANUFACTURING POLARIZING PLATE

(71) Applicant: NITTO DENKO CORPORATION, Ibaraki-shi, Osaka (JP)

(72) Inventors: Shusaku Goto, Ibaraki (JP); Kentaro Ikeshima, Ibaraki (JP); Yuuki Nakano, Ibaraki (JP); Osamu Kaneko, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 75 days.

(21) Appl. No.: 13/959,818

(22) Filed: Aug. 6, 2013

(65) Prior Publication Data
US 2014/0063603 A1 Mar. 6, 2014

(30) Foreign Application Priority Data
Aug. 28, 2012 (JP) .................. 2012-187401

(51) Int. Cl.
G02B 5/30 (2006.01)
B29D 11/00 (2006.01)
G02F 1/1335 (2006.01)

(52) U.S. Cl.
CPC .... *B29D 11/0073* (2013.01); *B29D 11/00644* (2013.01); *G02B 5/305* (2013.01);
(Continued)

(58) Field of Classification Search
CPC ........... B32B 2307/42; Y10T 156/1052; Y10T 156/1067; G02F 1/133528; G02B 5/3025; G02B 5/3033; G02B 5/3041; G02B 5/305
See application file for complete search history.

(56) References Cited

U.S. PATENT DOCUMENTS 8,314,987 B2 11/2012 Goto et al.
8,320,042 B2 11/2012 Goto et al.
(Continued)

FOREIGN PATENT DOCUMENTS

CN 100403069 C 7/2008
CN 100549738 C 10/2009
(Continued)

OTHER PUBLICATIONS

Office Action dated Jul. 1, 2015, issued in counterpart Japanese application No. 2012-187401 (w/English translation) (8 pages).
(Continued)

*Primary Examiner* — Carson Gross
(74) *Attorney, Agent, or Firm* — Westerman, Hattori, Daniels & Adrian, LLP

(57) ABSTRACT

A method of manufacturing a polarizing plate according to an embodiment of the present invention includes: stretching and dyeing a laminate including a resin substrate having a long shape and a polyvinyl alcohol-based resin layer formed on one side of the resin substrate, to thereby produce a polarizing film on the resin substrate; laminating an optically functional film on a side of the polarizing film of the laminate, to thereby produce an optically functional film laminate; and cutting widthwise direction end portions of the optically functional film laminate. The cut portions include the resin substrate, the polarizing film, and the optically functional film.

5 Claims, 2 Drawing Sheets

(52) U.S. Cl.
CPC ........ *B32B 2307/42* (2013.01); *G02B 5/3025* (2013.01); *G02F 1/133528* (2013.01); *Y10T 156/1052* (2015.01); *Y10T 156/1067* (2015.01)

(56) References Cited

U.S. PATENT DOCUMENTS

| | | | |
|---|---|---|---|
| 8,379,169 | B2 | 2/2013 | Kitagawa et al. |
| 8,411,360 | B2 | 4/2013 | Kitagawa et al. |
| 8,520,169 | B2 | 8/2013 | Kitagawa et al. |
| 8,520,171 | B2 | 8/2013 | Kitagawa et al. |
| 8,709,567 | B2 | 4/2014 | Kitagawa et al. |
| 8,721,816 | B2 | 5/2014 | Kitagawa et al. |
| 8,771,454 | B2 | 7/2014 | Goto et al. |
| 8,852,374 | B2 | 10/2014 | Goto et al. |
| 9,023,168 | B2 | 5/2015 | Kitagawa et al. |
| 9,039,860 | B2 | 5/2015 | Kunai |
| 9,128,247 | B2 | 9/2015 | Kunai |
| 2006/0072221 | A1* | 4/2006 | Nishikouji et al. ........... 359/834 |
| 2007/0134459 | A1* | 6/2007 | Hubert et al. ............... 428/40.1 |
| 2008/0007829 | A1 | 1/2008 | Mizushima et al. |
| 2008/0192345 | A1* | 8/2008 | Mochizuki et al. .......... 359/485 |
| 2012/0055607 | A1 | 3/2012 | Kitagawa et al. |
| 2012/0055608 | A1 | 3/2012 | Kitagawa et al. |
| 2012/0055621 | A1 | 3/2012 | Goto et al. |
| 2012/0055622 | A1 | 3/2012 | Kitagawa et al. |
| 2012/0055623 | A1 | 3/2012 | Kitagawa et al. |
| 2012/0056211 | A1 | 3/2012 | Kitagawa et al. |
| 2012/0056340 | A1 | 3/2012 | Kitagawa et al. |
| 2012/0057104 | A1 | 3/2012 | Kitagawa et al. |
| 2012/0057107 | A1 | 3/2012 | Kitagawa et al. |
| 2012/0057231 | A1 | 3/2012 | Goto et al. |
| 2012/0057232 | A1 | 3/2012 | Goto et al. |
| 2012/0058291 | A1 | 3/2012 | Kitagawa et al. |
| 2012/0058321 | A1 | 3/2012 | Goto et al. |
| 2013/0100529 | A1 | 4/2013 | Kitagawa et al. |
| 2013/0114139 | A1 | 5/2013 | Kitagawa et al. |
| 2013/0192747 | A1* | 8/2013 | Kunai .......................... 156/229 |
| 2013/0220525 | A1 | 8/2013 | Kunai |
| 2014/0186568 | A1 | 7/2014 | Kitagawa et al. |
| 2015/0183199 | A1 | 7/2015 | Kitagawa et al. |

FOREIGN PATENT DOCUMENTS

| | | |
|---|---|---|
| JP | 2000-338329 A | 12/2000 |
| JP | 2002-071947 A | 3/2002 |
| JP | 2005-034681 A | 2/2005 |
| JP | 2010-049094 A | 3/2010 |
| JP | 2011-212550 A | 10/2011 |
| JP | 2012-022071 A | 2/2012 |
| JP | 2012-73575 A | 4/2012 |
| TW | 200643488 | 12/2006 |
| TW | 200700780 | 1/2007 |
| TW | 201202029 A | 1/2012 |
| WO | 2011/125957 A1 | 10/2011 |
| WO | 2013/114532 A1 | 8/2013 |

OTHER PUBLICATIONS

Office Action dated Apr. 27, 2016, issued in counterpart to Chinese Patent Application No. 201310381709.6, with English translation. (13 pages).

Office Action dated Aug. 4, 2016, issued in counterpart Taiwanese Patent Application No. 102128488, with English translation. (11 pages).

* cited by examiner

METHOD OF MANUFACTURING POLARIZING PLATE

This application claims priority under 35 U.S.C. Section 119 to Japanese Patent Application No. 2012-187401 filed on Aug. 28, 2012, which is herein incorporated by reference.

BACKGROUND OF THE INVENTION

1. Field of the Invention

The present invention relates to a method of manufacturing a polarizing plate.

2. Description of the Related Art

Polarizing films are placed on both sides of the liquid crystal cell of a liquid crystal display apparatus as a representative image display apparatus, the placement being attributable to the image-forming mode of the apparatus. For example, the following method has been proposed as a method of manufacturing the polarizing film (for example, Japanese Patent Application Laid-open No. 2000-338329). A laminate having a resin substrate and a polyvinyl alcohol (PVA)-based resin layer is stretched, and is then subjected to a dyeing treatment so that the polarizing film may be obtained on the resin substrate. According to such method, a polarizing film having a small thickness is obtained. Accordingly, the method has been attracting attention because of its potential to contribute to the thinning of a recent liquid crystal display apparatus.

By the way, the polarizing film is typically laminated on another optically functional film (e.g., a protective film) and is used as a polarizing plate. Here, in some cases, the resin substrate is released from the polarizing film, which involves a problem in that a failure in release of the resin substrate (e.g., rupture) is liable to occur.

SUMMARY OF THE INVENTION

The present invention has been made to solve the conventional problem, and the object of the present invention resides in the provision of a method of manufacturing a polarizing plate having excellent releasability of a resin substrate.

A method of manufacturing a polarizing plate according to an embodiment of the present invention includes: stretching and dyeing a laminate including a resin substrate having a long shape and a polyvinyl alcohol-based resin layer formed on one side of the resin substrate, to thereby produce a polarizing film on the resin substrate; laminating an optically functional film on a side of the polarizing film of the laminate, to thereby produce an optically functional film laminate; and cutting widthwise direction end portions of the optically functional film laminate. The cut portions include the resin substrate, the polarizing film, and the optically functional film.

In one embodiment of the present invention, the method includes releasing the resin substrate from the optically functional film laminate after the cutting.

In one embodiment of the present invention, the stretching of the laminate includes free-end stretching.

In one embodiment of the present invention, the stretching of the laminate includes underwater stretching.

According to another aspect of the present invention, a polarizing plate is provided. The polarizing plate is obtained by the method of manufacturing a polarizing plate as described above.

According to the present invention, it is possible to achieve excellent releasability of a resin substrate by cutting widthwise direction end portions of an optically functional film laminate. As a result, it is possible to manufacture a polarizing plate having an excellent external appearance while maintaining high productivity.

BRIEF DESCRIPTION OF THE DRAWINGS

In the accompanying drawings:

FIGS. 2A and 2B are a perspective view and a sectional view of the cutting step, respectively.

DETAILED DESCRIPTION OF THE PREFERRED EMBODIMENTS

Hereinafter, preferred embodiments of the present invention are described. However, the present invention is not limited to these embodiments.

A method of manufacturing a polarizing plate of the present invention includes: stretching and dyeing a laminate including a resin substrate having a long shape and a polyvinyl alcohol-based resin layer formed on one side of the resin substrate, thereby producing a polarizing film on the resin substrate; laminating an optically functional film on a polarizing film side of the laminate, thereby producing an optically functional film laminate; and cutting widthwise direction end portions of the optically functional film laminate. Hereinafter, the respective steps are described.

A. Step of Producing Polarizing Film

A-1. Laminate

Figure 1:
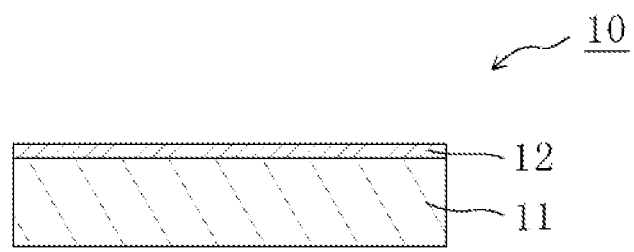
FIG. 1 is a partial sectional view of a laminate according to a preferred embodiment of the present invention.

FIG. 1 is a partial sectional view of a laminate according to a preferred embodiment of the present invention. A laminate 10 has a resin substrate 11 and a polyvinyl alcohol-based resin layer 12. The laminate 10 is produced by forming the polyvinyl alcohol-based resin layer 12 on the resin substrate 11 having a long shape. Any appropriate method can be adopted as a method of forming the polyvinyl alcohol-based resin layer 12. The polyvinyl alcohol-based resin (hereinafter referred to as "PVA-based resin") layer 12 is preferably formed by applying an application liquid containing a PVA-based resin onto the resin substrate 11 and drying the liquid.

As a formation material for the resin substrate, any appropriate thermoplastic resin can be adopted. Examples of the thermoplastic resin include: an ester-based resin such as a polyethylene terephthalate-based resin; a cycloolefin-based resin such as a norbornene-based resin; an olefin-based resin such as polypropylene; a polyamide-based resin; a polycarbonate-based resin; and a copolymer resin thereof. Of those, a norbornene-based resin and an amorphous polyethylene terephthalate-based resin are preferred.

In one embodiment, amorphous (uncrystallized) polyethylene terephthalate-based resins are each preferably used. Of those, a noncrystalline (hard-to-crystallize) polyethylene terephthalate-based resin is particularly preferably used. Specific examples of the noncrystalline polyethylene terephthalate-based resin include a copolymer further containing isophthalic acid as a dicarboxylic acid and a copolymer further containing cyclohexane dimethanol as a glycol.

When an underwater stretching mode is adopted in the stretching to be described later, the resin substrate absorbs water and the water serves a plastic function so that the substrate can plasticize. As a result, a stretching stress can be significantly reduced. Accordingly, the stretching can be performed at a high ratio and stretchability can be more excellent than that at the time of in-air stretching. As a result, a polarizing film having excellent optical characteristics can be produced. In one embodiment, the percentage of water absorption of the resin substrate is preferably 0.2% or more, more preferably 0.3% or more. Meanwhile, the percentage of water absorption of the resin substrate is preferably 3.0% or less, more preferably 1.0% or less. The use of such resin substrate can prevent, for example, the following inconvenience. The dimensional stability of the resin substrate remarkably reduces at the time of the manufacture and hence the external appearance of the polarizing film to be obtained deteriorates. In addition, the use can prevent the rupture of the substrate at the time of the underwater stretching and the release of the PVA-based resin layer from the resin substrate. It should be noted that the percentage of water absorption of the resin substrate can be adjusted by, for example, introducing a modification group into a constituent material. The percentage of water absorption is a value determined in conformity with JIS K 7209.

The glass transition temperature (Tg) of the resin substrate is preferably 170° C. or less. The use of such resin substrate can sufficiently secure the stretchability of the laminate while suppressing the crystallization of the PVA-based resin layer. Further, the glass transition temperature is more preferably 120° C. or less in consideration of the plasticization of the resin substrate by water and favorable performance of the underwater stretching. In one embodiment, the glass transition temperature of the resin substrate is preferably 60° C. or more. The use of such resin substrate prevents an inconvenience such as the deformation of the resin substrate (e.g., the occurrence of unevenness, a slack, or a wrinkle) during the application and drying of the application liquid containing the PVA-based resin, thereby enabling favorable production of the laminate. In addition, the use enables favorable stretching of the PVA-based resin layer at a suitable temperature (e.g., about 60° C.). In another embodiment, a glass transition temperature lower than 60° C. is permitted as long as the resin substrate does not deform during the application and drying of the application liquid containing the PVA-based resin. It should be noted that the glass transition temperature of the resin substrate can be adjusted by, for example, introducing a modification group into the constituent material or heating the substrate constituted of a crystallization material. The glass transition temperature (Tg) is a value determined in conformity with JIS K 7121.

The thickness of the resin substrate before the stretching is preferably 20 μm to 300 μm, more preferably 50 μm to 200 μm. When the thickness is less than 20 μm, it may be difficult to form the PVA-based resin layer. When the thickness exceeds 300 μm, in, for example, underwater stretching, it may take a long time for the resin substrate to absorb water, and an excessively large load may be needed in the stretching.

Any appropriate resin can be adopted as the PVA-based resin for forming the PVA-based resin layer. Examples of the resin include a polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically 85 mol % to 100 mol %, preferably 95.0 mol % to 99.95 mol %, more preferably 99.0 mol % to 99.93 mol %. The saponification degree can be determined in conformity with JIS K 6726-1994. The use of the PVA-based resin having such saponification degree can provide a polarizing film excellent in durability. When the saponification degree is excessively high, the resin may gel.

The average polymerization degree of the PVA-based resin can be appropriately selected depending on purposes. The average polymerization degree is typically 1,000 to 10,000, preferably 1,200 to 4,500, more preferably 1,500 to 4,300. It should be noted that the average polymerization degree can be determined in conformity with JIS K 6726-1994.

The application liquid is typically a solution prepared by dissolving the PVA-based resin in a solvent. Examples of the solvent include water, dimethylsulfoxide, dimethylformamide, dimethylacetamide, N-methylpyrrolidone, various glycols, polyhydric alcohols such as trimethylolpropane, and amines such as ethylenediamine and diethylenetriamine. The solvent can be used alone or in combination. Of those, water is preferred. The concentration of the PVA-based resin of the solution is preferably 3 parts by weight to 20 parts by weight with respect to 100 parts by weight of the solvent. At such resin concentration, a uniform coating film in close contact with the resin substrate can be formed.

The application liquid may be compounded with an additive. Examples of the additive include a plasticizer and a surfactant. Examples of the plasticizer include polyhydric alcohols such as ethylene glycol and glycerin. Examples of the surfactant include nonionic surfactants. Such additive can be used for the purpose of additionally improving the uniformity, dyeing property, or stretchability of the PVA-based resin layer to be obtained. In addition, examples of the additive include an easy-adhesion component. The use of the easy-adhesion component can improve adhesiveness between the resin substrate and the PVA-based resin layer. As a result, an inconvenience such as release of the PVA-based resin layer from the substrate is suppressed, and dyeing and underwater stretching to be described later can be favorably performed. In addition, in such embodiment, the effect of improving the releasability of the resin substrate in the cutting step to be described later can be significant.

Examples of the easy-adhesion component include a modified PVA such as acetoacetyl modified PVA. A polymer having at least a repeating unit represented by the following general formula (I) is preferably used as the acetoacetyl modified PVA.

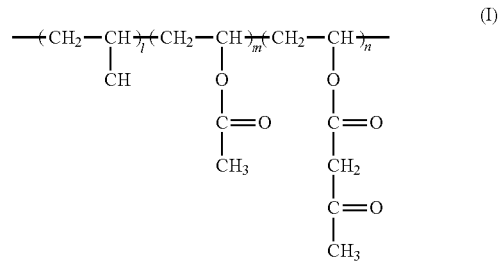

In the formula (I), the ratio of "n" to "l+m+n" (modification degree) is preferably 1% to 10%.

The saponification degree of the acetoacetyl modified PVA is preferably 97 mol % or more. In addition, the pH of a 4-wt % aqueous solution of the acetoacetyl modified PVA is preferably 3.5 to 5.5.

The modified PVA is added so that the amount of the modified PVA is preferably 3 wt % or more, more preferably 5 wt % or more relative to the total weight of the PVA-based resins in the application liquid. On the other hand, the amount of the modified PVA added is preferably 30 wt % or less.

Any appropriate method can be adopted as a method of applying the application liquid. Examples of the method include a roll coating method, a spin coating method, a wire bar coating method, a dip coating method, a die coating method, a curtain coating method, a spray coating method, and a knife coating method (comma coating method or the like).

The application liquid is preferably applied and dried at a temperature of 50° C. or more.

The thickness of the PVA-based resin layer before the stretching is preferably 3 μm to 40 μm, more preferably 3 μm to 20 μm.

The resin substrate may be subjected to a surface treatment (such as a corona treatment) before the formation of the PVA-based resin layer. Alternatively, an easy-adhesion layer may be formed on the resin substrate. Of those, the formation of an easy-adhesion layer (a coating treatment) is preferably performed. For example, an acrylic resin or a polyvinyl alcohol-based resin is used as a material for forming the easy-adhesion layer, and the polyvinyl alcohol-based resin is particularly preferred. Examples of the polyvinyl alcohol-based resin include a polyvinyl alcohol resin and a modified product thereof. Examples of the modified product of the polyvinyl alcohol resin include the acetoacetyl modified PVA. It should be noted that the thickness of the easy-adhesion layer is preferably about 0.05 to 1 μm. Such treatment can improve adhesiveness between the resin substrate and the PVA-based resin layer. As a result, for example, an inconvenience such as release of the PVA-based resin layer from the substrate is suppressed, and dyeing and underwater stretching to be described later can be favorably performed. In addition, in such embodiment, the effect of improving the releasability of the resin substrate in the cutting step to be described later can be significant.

A-2. Stretching of Laminate

Any appropriate method can be adopted as a method of stretching the laminate. Specifically, fixed-end stretching or free-end stretching may be adopted, and the free-end stretching is preferably adopted. The free-end stretching typically means a stretching method involving stretching the laminate in only one direction. When the laminate is stretched in one direction, the laminate may shrink in a direction approximately perpendicular to the stretching direction. A method of stretching the laminate without suppressing the shrinkage is referred to as free-end stretching.

The stretching direction of the laminate may be appropriately set. In one embodiment, the laminate having a long shape is stretched in its lengthwise direction. In this case, there may be typically adopted a method involving passing the laminate between rolls having different peripheral speeds to stretch the laminate. In another embodiment, the laminate having a long shape is stretched in its widthwise direction. In this case, there may be typically adopted a method involving stretching the laminate using a tenter stretching apparatus.

A stretching mode is not particularly limited and may be an in-air stretching mode, or may be an underwater stretching mode. Of those, the underwater stretching mode is preferably adopted. According to the underwater stretching mode, the stretching can be performed at a temperature lower than the glass transition temperature (typically about 80° C.) of each of the resin substrate and the PVA-based resin layer, and hence the PVA-based resin layer can be stretched at a high ratio while its crystallization is suppressed. As a result, a polarizing film having excellent optical characteristics can be produced. It should be noted that when the underwater stretching can be favorably performed, adhesiveness between the resin substrate and the PVA-based resin layer can be excellent, resulting in a significant effect of improving the releasability of the resin substrate in the cutting step to be described later.

The stretching of the laminate may be performed in one stage, or may be performed in a plurality of stages. When the stretching is performed in a plurality of stages, for example, the free-end stretching and fix-end stretching may be performed in combination, or the underwater stretching mode and in-air stretching mode may be performed in combination. When the stretching is performed in a plurality of stages, the stretching ratio (maximum stretching ratio) of the laminate to be described later is the product of stretching ratios in the respective stages.

The stretching temperature of the laminate can be set to any appropriate value depending on, for example, a formation material for the resin substrate and the stretching mode. When the in-air stretching mode is adopted, the stretching temperature is preferably equal to or higher than the glass transition temperature (Tg) of the resin substrate, more preferably higher than the glass transition temperature (Tg) of the resin substrate by 10° C. or more, particularly preferably higher than the Tg by 15° C. or more. Meanwhile, the stretching temperature of the laminate is preferably 170° C. or less. Performing the stretching at such temperature suppresses rapid progress of the crystallization of the PVA-based resin, thereby enabling the suppression of an inconvenience due to the crystallization (such as the inhibition of the orientation of the PVA-based resin layer by the stretching).

When the underwater stretching mode is adopted, the liquid temperature of a stretching bath is preferably 40° C. to 85° C., more preferably 50° C. to 85° C. At such temperature, the PVA-based resin layer can be stretched at a high ratio while its dissolution is suppressed. Specifically, as described above, the glass transition temperature (Tg) of the resin substrate is preferably 60° C. or more in relation to the formation of the PVA-based resin layer. In this case, when the stretching temperature falls short of 40° C., there is a possibility that the stretching cannot be favorably performed even in consideration of the plasticization of the resin substrate by water. On the other hand, as the temperature of the stretching bath increases, the solubility of the PVA-based resin layer is raised and hence excellent optical characteristics may not be obtained. The immersion time of the laminate in the stretching bath is preferably 15 seconds to 5 minutes.

When the underwater stretching mode is adopted, the laminate is preferably stretched by being immersed in an aqueous solution of boric acid (boric acid underwater stretching). The use of the aqueous solution of boric acid as the stretching bath can impart, to the PVA-based resin layer, rigidity enough to withstand a tension to be applied at the time of the stretching and such water resistance that the layer does not dissolve in water. Specifically, boric acid can produce a tetrahydroxyborate anion in the aqueous solution to cross-link with the PVA-based resin through a hydrogen bond. As a result, the PVA-based resin layer can be favorably stretched with the aid of the rigidity and the water resistance imparted thereto, and hence a polarizing film having excellent optical characteristics can be produced.

The aqueous solution of boric acid is preferably obtained by dissolving boric acid and/or a borate in water as a solvent. The concentration of boric acid is preferably 1 part by weight to 10 parts by weight with respect to 100 parts by weight of water. Setting the concentration of boric acid to 1 part by weight or more can effectively suppress the dissolution of the PVA-based resin layer, thereby enabling the production of a polarizing film having additionally high characteristics. It should be noted that an aqueous solution obtained by dissolving a boron compound such as borax, glyoxal, glutaric aldehyde, or the like as well as boric acid or the borate in the solvent can also be used.

When the PVA-based resin layer has been caused to adsorb a dichromatic substance (typically iodine) in advance by dyeing to be described later, the stretching bath (aqueous solution of boric acid) is preferably compounded with an iodide. Compounding the bath with the iodide can suppress the elution of iodine which the PVA-based resin layer has been caused to adsorb. Examples of the iodide include potassium iodide, lithium iodide, sodium iodide, zinc iodide, aluminum iodide, lead iodide, copper iodide, barium iodide, calcium iodide, tin iodide, and titanium iodide. Of those, potassium iodide is preferred. The concentration of the iodide is preferably 0.05 part by weight to 15 parts by weight, more preferably 0.5 part by weight to 8 parts by weight with respect to 100 parts by weight of water.

The stretching ratio (maximum stretching ratio) of the laminate is preferably 5.0 times or more with respect to the original length of the laminate. Such high stretching ratio can be achieved by adopting, for example, the underwater stretching mode (boric acid underwater stretching). It should be noted that the term "maximum stretching ratio" as used herein refers to a stretching ratio immediately before the rupture of the laminate. The stretching ratio at which the laminate ruptures is separately identified and a value lower than the value by 0.2 is the maximum stretching ratio.

In a preferred embodiment, the laminate is subjected to in-air stretching at a high temperature (e.g., 95° C. or more), and then subjected to the boric acid underwater stretching, and dyeing to be described later. Such in-air stretching is hereinafter referred to as "in-air auxiliary stretching" because the stretching can be ranked as stretching preliminary or auxiliary to the boric acid underwater stretching.

When the in-air auxiliary stretching is combined with the boric acid underwater stretching, the laminate can be stretched at an additionally high ratio in some cases. As a result, a polarizing film having additionally excellent optical characteristics (such as a polarization degree) can be produced. For example, when a polyethylene terephthalate-based resin is used as the resin substrate, the resin substrate can be stretched favorably, while its orientation is suppressed, by a combination of the in-air auxiliary stretching and the boric acid underwater stretching than that in the case of the boric acid underwater stretching alone. As the orientation property of the resin substrate is raised, its stretching tension increases and hence it becomes difficult to stably stretch the substrate or the resin substrate ruptures. Accordingly, the laminate can be stretched at an additionally high ratio by stretching the resin substrate while suppressing its orientation.

In addition, when the in-air auxiliary stretching is combined with the boric acid underwater stretching, the orientation property of the PVA-based resin is improved and hence the orientation property of the PVA-based resin can be improved even after the boric acid underwater stretching. Specifically, the orientation property of the PVA-based resin is improved in advance by the in-air auxiliary stretching so that the PVA-based resin may easily cross-link with boric acid during the boric acid underwater stretching. Then, the stretching is performed in a state where boric acid serves as a junction, and hence the orientation property of the PVA-based resin is assumed to be high even after the boric acid underwater stretching. As a result, a polarizing film having excellent optical characteristics (such as a polarization degree) can be produced.

The stretching ratio in the in-air auxiliary stretching is preferably 3.5 times or less. A stretching temperature in the in-air auxiliary stretching is preferably equal to or higher than the glass transition temperature of the PVA-based resin. The stretching temperature is preferably 95° C. to 150° C. It should be noted that the maximum stretching ratio when the in-air auxiliary stretching and the boric acid underwater stretching are combined with each other is preferably 5.0 times or more, more preferably 5.5 times or more, still more preferably 6.0 times or more with respect to the original length of the laminate.

A-3. Dyeing

The dyeing of the laminate is typically performed by causing the PVA-based resin layer to adsorb a dichromatic substance (preferably iodine). A method for the adsorption is, for example, a method involving immersing the PVA-based resin layer (laminate) in a dyeing liquid containing iodine, a method involving applying the dyeing liquid to the PVA-based resin layer, or a method involving spraying the dyeing liquid on the PVA-based resin layer. Of those, the method involving immersing the laminate in the dyeing liquid is preferred. This is because iodine can favorably adsorb to the PVA-based resin layer.

The dyeing liquid is preferably an aqueous solution of iodine. The compounding amount of iodine is preferably 0.1 part by weight to 0.5 part by weight with respect to 100 parts by weight of water. The aqueous solution of iodine is preferably compounded with an iodide in order that the solubility of iodine in water may be increased. Specific examples of the iodide are as described above. The compounding amount of the iodide is preferably 0.02 part by weight to 20 parts by weight, more preferably 0.1 part by weight to 10 parts by weight with respect to 100 parts by weight of water. The liquid temperature of the dyeing liquid at the time of the dyeing is preferably 20° C. to 50° C. in order that the dissolution of the PVA-based resin may be suppressed. When the PVA-based resin layer is immersed in the dyeing liquid, an immersion time is preferably 5 seconds to 5 minutes in order that the transmittance of the PVA-based resin layer may be secured. In addition, the dyeing conditions (the concentration, the liquid temperature, and the immersion time) can be set so that the polarization degree or single axis transmittance of the polarizing film to be finally obtained may fall within a predetermined range. In one embodiment, the immersion time is set so that the polarization degree of the polarizing film to be obtained may be 99.98% or more. In another embodiment, the immersion time is set so that the single axis transmittance of the polarizing film to be obtained may be 40% to 44%.

The dyeing treatment can be performed at any appropriate timing. When the underwater stretching is performed, the dyeing treatment is preferably performed before the underwater stretching.

A-4. Any Other Treatment

The laminate may be appropriately subjected to a treatment for forming the PVA-based resin layer into a polarizing film in addition to the stretching and dyeing. Examples of the treatment for forming the PVA-based resin layer into the polarizing film include an insolubilizing treatment, a cross-linking treatment, a washing treatment, and a drying treatment. It should be noted that the number of times, order, and the like of these treatments are not particularly limited.

The insolubilizing treatment is typically performed by immersing the PVA-based resin layer in an aqueous solution of boric acid. Water resistance can be imparted to the PVA-based resin layer by subjecting the layer to the insolubilizing treatment. The concentration of the aqueous solution of boric acid is preferably 1 part by weight to 4 parts by weight with respect to 100 parts by weight of water. The liquid temperature of an insolubilizing bath (the aqueous solution of boric acid) is preferably 20° C. to 50° C. The insolubilizing treatment is preferably performed before the underwater stretching or the dyeing treatment.

The cross-linking treatment is typically performed by immersing the PVA-based resin layer in an aqueous solution of boric acid. Water resistance can be imparted to the PVA-based resin layer by subjecting the layer to the cross-linking treatment. The concentration of the aqueous solution of boric acid is preferably 1 part by weight to 5 parts by weight with respect to 100 parts by weight of water. In addition, when the cross-linking treatment is performed after the dyeing treatment, the solution is preferably further compounded with an iodide. Compounding the solution with the iodide can suppress the elution of iodine which the PVA-based resin layer has been caused to adsorb. The compounding amount of the iodide is preferably 1 part by weight to 5 parts by weight with respect to 100 parts by weight of water. Specific examples of the iodide are as described above. The liquid temperature of a cross-linking bath (the aqueous solution of boric acid) is preferably 20° C. to 60° C. The cross-linking treatment is preferably performed before the underwater stretching. In a preferred embodiment, the dyeing treatment, the cross-linking treatment, and the underwater stretching are performed in the stated order.

The washing treatment is typically performed by immersing the PVA-based resin layer in an aqueous solution of potassium iodide. A drying temperature in the drying treatment is preferably 30° C. to 100° C.

A-5. Polarizing Film

The polarizing film is substantially a PVA-based resin film that adsorbs and orients a dichromatic substance. The thickness of the polarizing film is typically 25 μm or less, preferably 15 μm or less, more preferably 10 μm or less, still more preferably 7 μm or less, particularly preferably 5 μm or less. Meanwhile, the thickness of the polarizing film is preferably 0.5 μm or more, more preferably 1.5 μm or more. The polarizing film preferably shows absorption dichroism at any wavelength in the wavelength range of 380 nm to 780 nm. The single axis transmittance of the polarizing film is preferably 40.0% or more, more preferably 41.0% or more, still more preferably 42.0% or more, particularly preferably 43.0% or more. The polarization degree of the polarizing film is preferably 99.8% or more, more preferably 99.9% or more, still more preferably 99.95% or more.

B. Step of Producing Optically Functional Film Laminate

After the laminate (PVA-based resin layer) has been subjected to the respective treatments, an optically functional film is laminated on the polarizing film (PVA-based resin layer) side of the laminate. Specifically, an optically functional film having a long shape is laminated on the laminate so that their lengthwise directions are aligned. The width of the optically functional film is set depending on, for example, the width of the polarizing film of the laminate, and may be larger or smaller than, or substantially the same as the width of the polarizing film. The width of the optically functional film is preferably set to be larger than the width of the polarizing film. In this case, the optically functional film is preferably laminated thereon so that the optically functional film protrudes toward the outsides of the both widthwise directions of the polarizing film. The widths of the laminate (polarizing film) and the optically functional film may be set to any appropriate values. The widths are each typically 500 mm or more and 2,000 mm or less, preferably 1,000 mm or more and 2,000 mm or less.

The optically functional film can function as, for example, a protective film for a polarizing film or a retardation film.

As the optically functional film, any appropriate resin film may be adopted. As a formation material for the optically functional film, there are given, for example: a cellulose-based resin such as triacetyl cellulose (TAC); a cycloolefin-based resin such as a norbornene-based resin; an olefin-based resin such as polyethylene or polypropylene; a polyester-based resin; and a (meth) acrylic resin. It should be noted that the term "(meth)acrylic resin" refers to an acrylic resin and/or a methacrylic resin.

The thickness of the optically functional film is typically 10 μm to 100 μm. It should be noted that the optically functional film may be subjected to various surface treatments.

The lamination of the optically functional film is performed using any appropriate adhesive or pressure-sensitive adhesive. In a preferred embodiment, the adhesive is applied to the surface of the polarizing film before the optically functional film is attached. The adhesive may be an aqueous adhesive, or may be a solvent-based adhesive. Of those, the aqueous adhesive is preferably used.

Any appropriate aqueous adhesive can be adopted as the aqueous adhesive. An aqueous adhesive containing a PVA-based resin is preferably used. The average polymerization degree of the PVA-based resin in the aqueous adhesive is preferably about 100 to 5,000, more preferably 1,000 to 4,000 in terms of adhesion. Its average saponification degree is preferably about 85 mol % to 100 mol %, more preferably 90 mol % to 100 mol % in terms of adhesion.

The PVA-based resin in the aqueous adhesive preferably contains an acetoacetyl group. This is because such resin can be excellent in adhesiveness between the PVA-based resin layer and the cover film, and in durability. The acetoacetyl group-containing PVA-based resin is obtained by, for example, causing a PVA-based resin and diketene to react with each other by any appropriate method. The acetoacetyl group modification degree of the acetoacetyl group-containing PVA-based resin is typically 0.1 mol % or more, preferably about 0.1 mol % to 40 mol %, more preferably 1 mol % to 20 mol %, particularly preferably 2 mol % to 7 mol %. It should be noted that the acetoacetyl group modification degree is a value measured by NMR.

The resin concentration of the aqueous adhesive is preferably 0.1 wt % to 15 wt %, more preferably 0.5 wt % to 10 wt %.

The thickness of the adhesive at the time of the application can be set to any appropriate value. For example, the thickness is set so that an adhesive layer having a desired thickness may be obtained after heating (drying). The thickness of the adhesive layer is preferably 10 nm to 300 nm, more preferably 10 nm to 200 nm, particularly preferably 20 nm to 150 nm.

Heating is preferably performed after lamination of the optically functional film. A temperature for the heating is preferably 50° C. or more, more preferably 55° C. or more, still more preferably 60° C. or more, particularly preferably 80° C. or more. It should be noted that the heating performed after lamination of the optically functional film may also serve as the drying treatment of the laminate. In addition, the heating may be performed after a cutting step to be described later, and is preferably performed before the cutting step. This is because cutting can be performed with very high accuracy.

C. Cutting Step

The optically functional film laminate is cut (slit) at its widthwise direction end portions. The resultant cut portions include the resin substrate, the polarizing film, and the optically functional film. Specifically, the optically functional film laminate is cut based on the widthwise direction end portions of the polarizing film or the optically functional film. The cut width is preferably 3 mm or more, more preferably 5 mm or more from the end of the polarizing film or the optically functional film. Such cut width enables sufficiently cutting a part of attachment failure caused by curling to be described later. As a result, very excellent releasability of the resin substrate can be achieved. Meanwhile, from the standpoint of yield, the cut width is preferably 200 mm or less, for example, from the end of the polarizing film or the optically functional film.

Any appropriate method can be adopted as a method of cutting (slitting) the optically functional film laminate. For example, an optically functional film laminate having a long shape may be cut while the laminate is wound in its lengthwise direction or without winding the laminate. As cutting means, for example, there are given a chopping blade such as a round blade or a dish blade, and a laser. It should be noted that the cut portions are preferably removed by winding-off or aspiration.

Figure 2A:
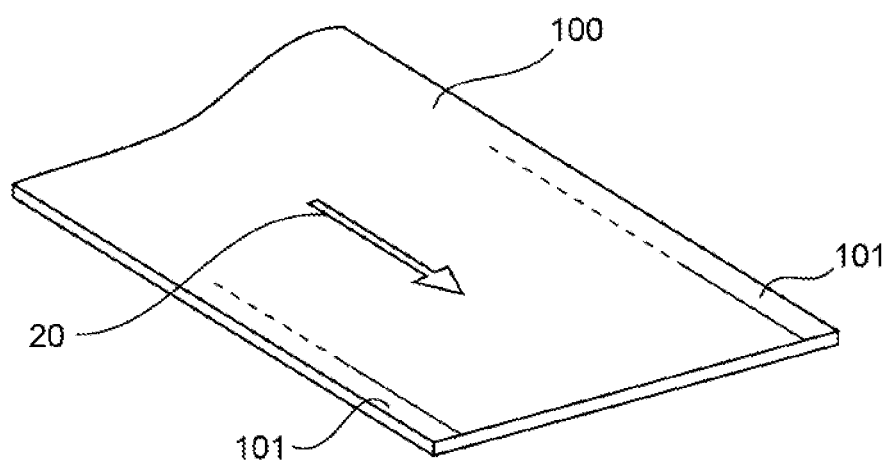
FIGS. 2A and 2B are schematic views illustrating examples of a cutting step in the present invention.
Figure 2B:
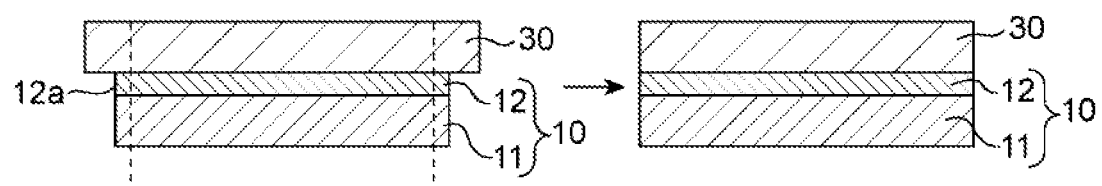

FIGS. 2A and 2B are schematic views illustrating an example of the cutting step. FIGS. 2A and 2B are a perspective view and a sectional view, respectively. As illustrated in FIGS. 2A and 2B, an optically functional film laminate 100 has a laminate 10 stretched in its lengthwise direction 20 and an optically functional film 30, and both widthwise direction end portions of the optically functional film 30 are protruding portions which protrude toward the outsides of the widthwise direction of a polarizing film 12. In the optically functional film laminate 100, the both widthwise direction end portions 101 and 101 are cut approximately parallel to the lengthwise direction (stretching direction) 20 of the laminate 10. In the illustrated examples, the cut width is preferably set based on the end 12a of the polarizing film 12 because the width of the optically functional film 30 is set to be larger than the width of the polarizing film 12. It should be noted that unlike the illustrated examples, when the width of the optically functional film is set to be smaller than the width of the polarizing film, the cut width is preferably set based on the end of the optically functional film.

The polarizing plate according to an embodiment of the present invention is obtained by cutting (slitting) the widthwise direction end portions of the optically functional film laminate.

D. Releasing Step

After the cutting, the resin substrate is released from the optically functional film laminate. According to an embodiment of the present invention, the cutting can achieve excellent releasability of the resin substrate. As a result, a polarizing plate having excellent external appearance can be manufactured while maintaining high productivity. Specifically, an attachment failure (e.g., wrinkle) is liable to occur at an attachment part between the widthwise direction end portion of the laminate and the optically functional film, and the part of the attachment failure causes a failure in release of the resin substrate (e.g., rupture). One possible factor for the attachment failure is curling of the laminate. The curling is liable to occur at the widthwise direction end portions of the laminate. One possible factor for the curling is shrinkage caused by stretching. When the laminate is stretched, the curling is caused by a difference in shrinkage force between the PVA-based resin layer and the resin substrate (typically, the shrinkage force of the PVA-based resin layer is larger). The shrinkage direction is typically approximately perpendicular to the stretching direction. When the laminate is stretched in its lengthwise direction (longitudinal stretching), convex curling may occur on the resin substrate side approximately parallel to the stretching direction. Meanwhile, when the laminate is stretched in its widthwise direction (lateral stretching), specifically, when the laminate is stretched while holding the ends of the laminate with clips of a tenter stretching apparatus, curling may occur near portions held with the clips by applying a tension toward the outside of the widthwise direction after stretching. As mentioned above, the curling tends to occur at the widthwise direction end portions of the laminate in the longitudinal stretching and the lateral stretching.

EXAMPLES

Hereinafter, the present invention is specifically described by way of examples. However, the present invention is not limited by these examples. It should be noted that methods of measuring the respective characteristics are as described below.

1. Thickness

Measurement was performed with a digital micrometer (manufactured by Anritsu Corporation, product name: "KC-351C").

2. Glass Transition Temperature (Tg)

Measurement was performed in conformity with JIS K 7121.

Example 1

An amorphous polyethylene terephthalate (A-PET) film (manufactured by Mitsubishi Chemical Corporation, trade name: "NOVACLEAR," thickness: 100 μm) having a long shape and having a percentage of water absorption of 0.60% and a Tg of 80° C. was used as a resin substrate.

One surface of the resin substrate was subjected to a corona treatment, and an aqueous solution containing 90 parts by weight of polyvinyl alcohol (polymerization degree: 4,200, saponification degree: 99.2 mol %) and 10 parts by weight of acetoacetyl-modified PVA (polymerization degree: 1,200, acetoacetyl modification degree: 4.6%, saponification degree: 99.0 mol % or more, manufactured by The Nippon Synthetic Chemical Industry Co., Ltd., trade name: "GOHSEFIMER Z200") was applied to the surface, and was then dried at 60° C. so that a PVA-based resin layer having a thickness of 10 μm was formed, thereby producing a laminate.

The resultant laminate was subjected to free-end uniaxial stretching in its longitudinal direction (lengthwise direction) at 1.8 times in an oven at 120° C. between rolls having different peripheral speeds (in-air auxiliary stretching).

Next, the laminate was immersed in an insolubilizing bath having a liquid temperature of 30° C. (an aqueous solution of boric acid obtained by compounding 100 parts by weight of water with 4 parts by weight of boric acid) for 30 seconds (insolubilizing treatment).

Next, the laminate was immersed in a dyeing bath having a liquid temperature of 30° C. (an aqueous solution of iodine obtained by compounding 100 parts by weight of water with 0.2 part by weight of iodine and 1.0 part by weight of potassium iodide) for 60 seconds (dyeing treatment).

Next, the laminate was immersed in a cross-linking bath having a liquid temperature of 30° C. (an aqueous solution of boric acid obtained by compounding 100 parts by weight of water with 3 parts by weight of potassium iodide and 3 parts by weight of boric acid) for 30 seconds (cross-linking treatment).

After that, the laminate was uniaxially stretched in its longitudinal direction (lengthwise direction) between rolls having different peripheral speeds while being immersed in an aqueous solution of boric acid having a liquid temperature of 70° C. (an aqueous solution obtained by compounding 100 parts by weight of water with 4 parts by weight of boric acid and 5 parts by weight of potassium iodide) (underwater stretching). In this case, the laminate was stretched immediately before its rupture (the maximum stretching ratio was 6.0 times).

After that, the laminate was immersed in a washing bath having a liquid temperature of 30° C. (an aqueous solution obtained by compounding 100 parts by weight of water with 4 parts by weight of potassium iodide) (washing treatment).

Subsequently, an aqueous solution of a PVA-based resin (manufactured by The Nippon Synthetic Chemical Industry Co., Ltd., trade name: "GOHSEFIMER (trademark) Z-200," resin concentration: 3 wt %) was applied to the surface of the PVA-based resin layer of the laminate. A triacetyl cellulose film having a long shape and a width larger than that of the PVA-based resin layer (manufactured by Konica Minolta, Inc., trade name: "KC4UY," thickness: 40 µm) was attached to the resultant so that the both ends of the film protruded toward the outsides of the both widthwise directions of the PVA-based resin layer, and the whole was heated in an oven maintained at 60° C. for 5 minutes, thereby producing an optically functional film laminate (polarizing plate) having a polarizing film with a thickness of 5 µm.

After that, the both widthwise direction end portions of the optically functional film laminate were slit from the end sides of the polarizing film (PVA-based resin layer) at an interval of 10 mm. Thus, a polarizing plate was obtained.

Example 2

A norbornene-based resin film (manufactured by JSR Corporation, trade name: "ARTON," thickness: 150 µm) having a long shape and a Tg of 130° C. was used as a resin substrate.

An aqueous solution of a polyvinyl alcohol (PVA) resin (manufactured by The Nippon Synthetic Chemical Industry Co., Ltd., trade name: "GOHSENOL (registered trademark) NH-26") having a polymerization degree of 2,600 and a saponification degree of 99.9% was applied to one surface of the resin substrate, and was then dried at 80° C. so that a PVA-based resin layer having a thickness of 7 µm was formed, thereby producing a laminate.

The resultant laminate was stretched in its widthwise direction at a stretching ratio of up to 4.5 times under heating at 140° C. with a tenter apparatus by free-end uniaxial stretching. The thickness of the PVA-based resin layer after the stretching treatment was 3 µm (in-air stretching).

Next, the laminate was immersed in a dyeing bath having a liquid temperature of 30° C. (an aqueous solution of iodine obtained by compounding 100 parts by weight of water with 0.5 part by weight of iodine and 3.5 parts by weight of potassium iodide) for 60 seconds (dyeing treatment).

Next, the laminate was immersed in a cross-linking bath having a liquid temperature of 60° C. (an aqueous solution of boric acid obtained by compounding 100 parts by weight of water with 5 parts by weight of potassium iodide and 5 parts by weight of boric acid) for 60 seconds (cross-linking treatment).

After that, the laminate was immersed in a washing bath (an aqueous solution obtained by compounding 100 parts by weight of water with 3 parts by weight of potassium iodide), and was then dried with warm air at 60° C. (washing and drying treatments).

Subsequently, an aqueous solution of a PVA-based resin (manufactured by The Nippon Synthetic Chemical Industry Co., Ltd., trade name: "GOHSEFIMER (trademark) Z-200," resin concentration: 3 wt %) was applied to the surface of the PVA-based resin layer of the laminate. A norbornene-based resin film having a long shape and a width larger than that of the PVA-based resin layer (manufactured by JSR Corporation, trade name: "ARTON," thickness: 35 µm) was attached to the resultant so that the both ends of the film protruded toward the outsides of the both widthwise directions of the PVA-based resin layer, and the whole was heated in an oven maintained at 80° C. for 5 minutes, thereby producing an optically functional film laminate (polarizing plate) having a polarizing film with a thickness of 3 µm.

After that, the both widthwise direction end portions of the optically functional film laminate were slit from the end sides of the polarizing film (PVA-based resin layer) at an interval of 10 mm. Thus, a polarizing plate was obtained.

Comparative Example 1

A polarizing plate was produced in the same manner as in Example 1 except that the both widthwise direction end portions were not slit.

Comparative Example 2

A polarizing plate was produced in the same manner as in Example 2 except that the both widthwise direction end portions were not slit.

The resin substrate was released in its lengthwise direction from each of the polarizing plates obtained in Examples and Comparative Examples to evaluate its releasability. Table 1 shows the evaluation results. It should be noted that evaluation criteria of the releasability are as follows.
(Releasability)
o: The resin substrate was able to be continuously released without its rupture.
x: A failure in release (such as rupture) occurred.

TABLE 1

| | Stretching direction | Presence or absence of slit | Releasability |
|---|---|---|---|
| Example 1 | Longitudinal direction | Presence | o |
| Example 2 | Lateral direction | Presence | o |
| Comparative Example 1 | Longitudinal direction | Absence | x |
| Comparative Example 2 | Lateral direction | Absence | x |

In each of Examples, the resin substrate was excellent in releasability, while in each of Comparative Examples, a failure in release occurred. The failure in release was caused by a failure in attachment at the widthwise direction end portions.

The polarizing plate of the present invention is suitably used for liquid crystal panels of, for example, liquid crystal televisions, liquid crystal displays, cellular phones, digital cameras, video cameras, portable game machines, car navigation systems, copying machines, printers, facsimile machines, clocks, and microwave ovens. The polarizing film of the present invention is also suitably used as an antireflection film for an organic EL device.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A method of manufacturing a polarizing plate, comprising:
   stretching and dyeing a laminate including a resin substrate having a long shape and a polyvinyl alcohol-based resin layer formed on one side of the resin substrate, to thereby produce a polarizing film on the resin substrate;
   laminating an optically functional film on a side of the polarizing film of the laminate, to thereby produce an optically functional film laminate; and
   cutting widthwise direction end portions of the optically functional film laminate, and
   releasing the resin substrate from the polarizing film after the cutting,
   wherein the cut portions comprise the resin substrate, the polarizing film, and the optically functional film,
   wherein the polarizing film has a thickness of up to 10 µm, and
   the polarizing film is thin relative to the resin substrate.

2. A method of manufacturing a polarizing plate according to claim 1, wherein the stretching of the laminate comprises free-end stretching.

3. A method of manufacturing a polarizing plate according to claim 1, wherein the stretching of the laminate comprises underwater stretching.

4. A method of manufacturing a polarizing plate according to claim 2, wherein the stretching of the laminate comprises underwater stretching.

5. The method of manufacturing a polarizing plate according to claim 1, wherein the resin substrate before stretching has a thickness of 20 µm to 300 µm and the polyvinyl alcohol-based resin layer before stretching has a thickness of 3 µm to 40 µm.

* * * * *